3,118,830
HYDROCONVERSION OF HYDROCARBONS
Warren G. Schlinger, Pasadena, Calif., and du Bois Eastman, deceased, late of Whittier, Calif., by Security First National Bank of Los Angeles, executor, assignors to Texaco Inc., New York, N.Y., a corporation of Delaware
Filed Mar. 8, 1961, Ser. No. 94,398
19 Claims. (Cl. 208—59)

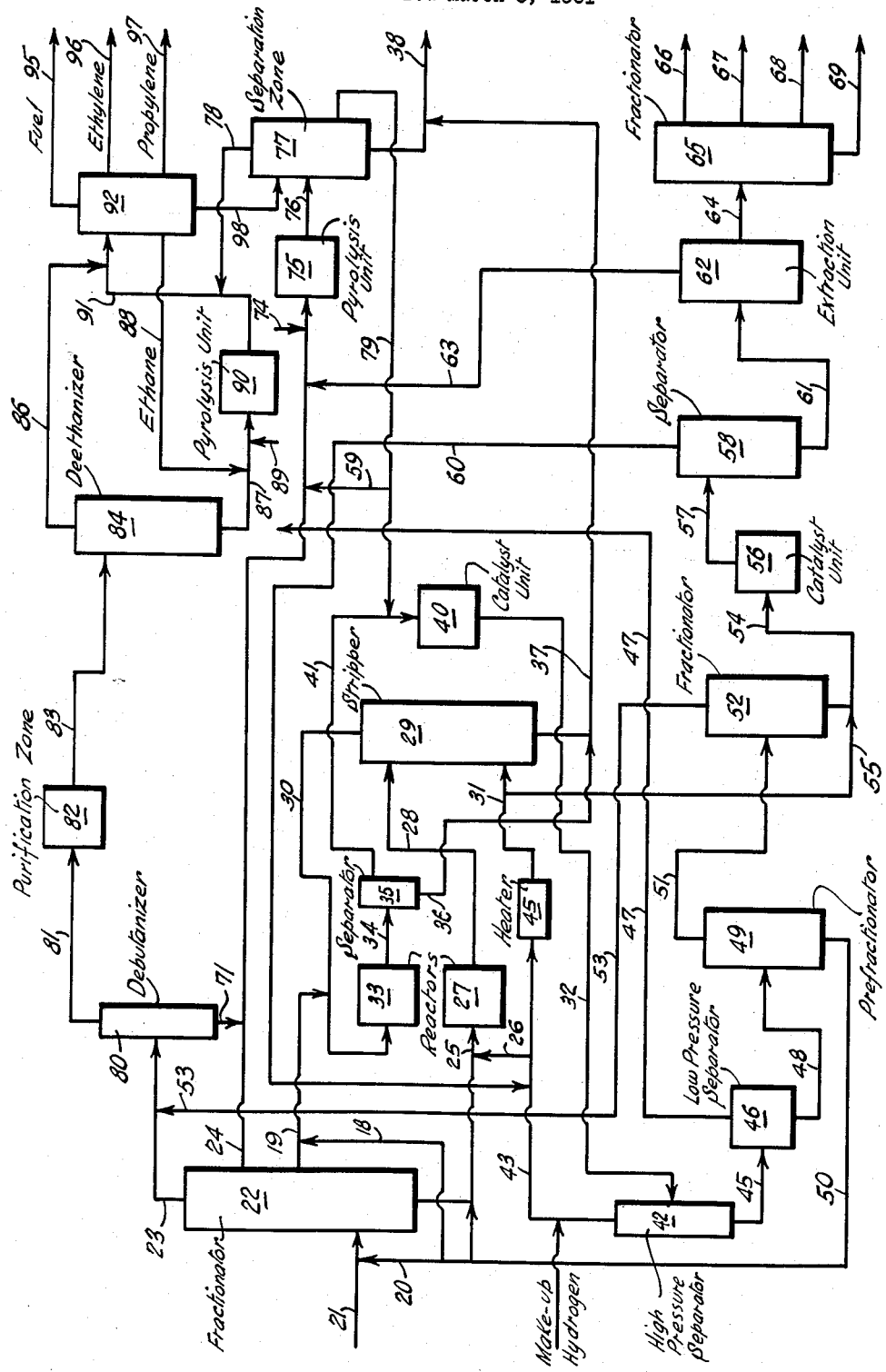

This invention relates to the hydroconversion of hydrocarbons. More particularly, it relates to the hydroconversion of normally liquid hydrocarbons under conditions of highly turbulent flow.

In its fundamental concept the present invention comprises a process for the hydroconversion of hydrocarbons in which a hydrocarbon oil and hydrogen are heated and passed through a first elongated reaction zone at elevated temperatures and pressures under conditions of highly turbulent flow, the effluent is separated into a liquid portion and a gaseous portion and the gaseous portion is passed through a second elongated reaction zone at elevated temperatures and pressures under conditions of highly turbulent flow. The hydroconversion product comprises a gaseous phase suitable for use as a heating gas or as a source of chemicals such as low molecular weight olefins and a liquid phase suitable for use a motor fuel or as a source of valuable chemical compounds such as aromatic hydrocarbons.

In a preferred embodiment of the present invention a hydrocarbon oil having for example an initial boiling point of about 700° F. is introduced with about 5,000 to 20,000 cu. ft. of hydrogen/bbl. of feed into a first reaction zone at a temperature between about 800 and 950° F. and a pressure between about 500 and 10,000 p.s.i.g. and is passed through the reaction zone at a turbulence level of at least 25. The effluent is separated into a gasiform portion and a liquid portion and the liquid portion is contacted with hydrogen, separately heated to a temperature of about 800 to 900° F., the unreacted hydrogen together with any hydrocarbon vapors formed in the contacting zone is combined with the gasiform portion and the combined stream is passed through a second elongated reaction zone at a temperature between about 850 and 1100° F., a pressure between about 500 and 10,000 p.s.i.g. and at a turbulence level of at least 25.

The effluent from the second reaction zone which is substantially completely in the vapor phase may then be separated into a hydrogen-rich gas which is recycled, a gaseous hydrocarbon fraction suitable for use as a fuel or for the production of hydrogen and a normally liquid hydrocarbon fraction useful as a motor fuel.

Advantageously the effluent from the second reaction zone, comprising a mixture of hydrogen and hydrocarbon vapors is, while still hot, passed to a catalytic treating zone where it is contacted with a sulfur resistant hydrogenation catalyst to effect conversion of the sulfur present into hydrogen sulfide and to effect some conversion of olefins to saturated compounds. Some additional hydroconversion takes place in the catalytic treating zone although the temperature in the catalytic zone is lower than that in either of the non-catalytic reaction zones.

The effluent from the catalytic zone may then be separated into a gas rich in hydrogen which can be recycled, a gaseous hydrocarbon fraction, which is suitable for use as a heating gas or for conversion into valuable chemicals such as hydrogen and/or low molecular weight olefins such as ethylene or propylene, and a normally liquid hydrocarbon fraction from which a fraction boiling in the motor fuel range may be separated and the balance if desired recycled to the first reaction zone. The motor fuel fraction has a high octane number due to its high aromatic content. If desired the motor fuel fraction may be treated to recover therefrom benzene, toluene and xylenes.

Hydrogen from any suitable source may be used in the hydroconversion steps of the present invention. Catalytic reformer by-product hydrogen, electrolytic hydrogen, or hydrogen produced by the partial combustion of carbonaceous materials is satisfactory. Ordinarily, the hydrogen need not be pure hydrogen and may contain as much as 25–50 volume percent impurities such as methane, ethane, $H_2S$, $CO$, $H_2O$ and the like.

Any hydrocarboxn liquid may be subjected to hydroconversion by the process of the present invention. Whole crude or any selected liquid fraction thereof such as naphtha, kerosene, straight run gas oil, topped crude or mixtures thereof and various other refinery streams or mixtures of hydrocarbon liquids may be used. The feed, together with hydrogen ranging in an amount from about 1000 to 50,000 cu. ft. per barrel preferably 5000 to 20,000 cu. ft./bbl., is introduced into a first tubular reaction zone maintained at a temperature between about 800 and 950° F. and a pressure between about 500 and 10,000 p.s.i.g. The hydrocarbon feed rate, hydrogen rate, temperature and pressure, taking into consideration the diameter of the tubular reaction zone, are controlled to maintain conditions of high turbulence within the reaction zone. The turbulence level, represented by the ratio $$\frac{\bar{\epsilon}_m}{\nu}$$

where $\bar{\epsilon}_m$ is the average apparent viscosity in sq. ft./sec. and $\nu$ is the kinematic viscosity in sq. ft./sec., should be maintained at at least 25. Tubulence levels between about 50 and 1000 are preferred.

The effluent from the first reaction zone ordinarily comprises unreacted hydrogen, vaporous hydrocarbons and some liquid hydrocarbons which last, under the existing conditions, are dispersed in the form of fine droplets in the vapor phase. The effluent, at substantially the temperature and pressure of the first reaction zone is separated into a gasiform portion comprising hydrogen and vaporous hydrocarbons and a liquid portion comprising non-volatilized hydrocarbons.

In a preferred embodiment, separation of the effluent from the first reaction zone into a gasiform portion and a liquid portion is effected by sending the effluent to a disengaging zone in the upper section of a tower where the hydrogen and hydrocarbon vapors are separated from the liquid. The liquid descends through the tower and is countercurrently contacted with a separately heated hydrogen stream amounting to between about 1000 and 50,000, preferably between about 5000 and 20,000 cu. ft./bbl. of feed to the first reaction zone. In the contacting or stripping zone additional hydroconversion takes place with the formation of additional vaporous hydrocarbons. Non-volatilized hydrocarbons are withdrawn from the bottom of the stripping zone and the vaporous hydrocarbons together with unreacted hydrogen are combined with the gasiform portion from the disengaging zone and the combined stream is introduced into a second reaction zone.

The reaction conditions of temperature and pressure in the second reaction zone are substantially the same as the conditions of the first reaction zone. Preferably however the temperature and turbulence level in the second zone are slightly higher than those of the first reaction zone. The naphtha recovered from the hydroconversion product is rich in aromatics and may be used as a motor fuel or may be treated to recover the aromatics therefrom.

Advantageously, regardless of its projected end use, the product from the second reaction zone is cooled by any suitable means to a temperature below about 900° F., and the uncondensed material is then passed into contact with a sulfur resistant hydrogenation catalyst to effect the conversion of combined sulfur and nitrogen to $H_2S$ and $NH_3$ respectively. Suitable catalysts are the oxides or sulfides of group VI or group VIII metals and mixtures thereof, such as nickel-tungsten sulfide, molybdenum sulfide, nickel-molybdenum sulfide, nickel-molybdenum oxide, cobalt-molybdenum oxide, cobalt-molybdenum sulfide, cobalt-nickel-molybdenum oxide or sulfide and mixtures thereof. Temperatures in the catalytic zone may range between 600 and 900° F. and pressures between about 100 and 2500 p.s.i.g. Space velocities of 0.1–10 volumes of liquid hydrocarbon per hour per volume of catalyst may be used although space velocities of 0.5–5 are preferred. Sufficient hydrogen is present in the hydroconversion effluent to maintain a satisfactory hydrogen partial pressure during the catalytic treatment.

After the separation of hydrogen and hydrocarbon gases and the removal of hydrocarbons boiling above about 400° F., the catalytically treated product is satisfactory for use as a high octane motor fuel.

If, however, aromatic hydrocarbons are the desired end product, a 160–450° F. fraction of the catalytically treated product is mixed with hydrogen in an amount ranging from about 350 to 5000 cu. ft./bbl. of hydrocarbon feed and the mixture is advantageously contacted with a second hydrogenation catalyst at a temperature between about 450–700° F., a pressure between about atmospheric and 1000 p.s.i.g. and a space velocity between about 0.5 and 10 volumes of feed per volume of catalyst per hour. This treatment effects substantial saturation of the olefins and diolefins present.

Hydrogen is flashed from the hydrogenation zone effluent and the normally liquid product is then contacted with a selective solvent such as diethylene glycol, triethylene glycol or mixtures thereof or furfural or the like to produce an extract phase rich in aromatics and a raffinate phase poor in aromatics. The aromatic hydrocarbons then may be distilled from the selective solvent and the distillate fractionated into the various aromatic hydrocarbons present such as benzene, toluene and xylene.

The raffinate which is composed for the most part of straight chain paraffins is suitable feedstock for conversion by pyrolysis into low molecular weight olefins such as ethylene and propylene. Advantageously this raffinate may be combined with a straight run naphtha prior to its introduction into the pyrolysis zone.

In a practical application of the process of the present invention a crude is separated into a $C_4$ and lighter fraction, a $C_5$—450° F. fraction and a 450° F. and heavier fraction. The 450° F. and heavier fraction is introduced into a first tubular reaction zone, the effluent is separated into a gaseous portion and a liquid portion, the liquid portion is contacted with hydrogen, the vapors recovered from the contacting and from the separating are combined and passed to a second tubular reaction zone, at least a portion of the effluent from the second reaction zone is catalytically treated for the removal of sulfur compounds and the hydrogenation of unsaturates, the hydrogenation product is then separated into a portion rich in aromatics and a portion rich in non-aromatics, the non-aromatic portion is combined with the $C_5$—450° F. fraction, the combined stream is subjected to pyrolysis, the $C_4$ and lighter fraction is also subjected to pyrolysis and the combined pyrolysis products are separated into valuable products such as fuel gas and low molecular weight olefins.

For a better understanding of the present invention and its practical application, reference is made to the accompanying drawing which illustrates diagrammatically a flow scheme utilizing the process of the present invention.

Referring now to the accompanying drawing, crude oil is introduced through line 21 into fractionator 22, where it is separated into a light fraction having an end point of about 250° F., removed through line 23, an intermediate fraction having a boiling range of from about 250–450° F. removed through line 24, and a heavy fraction having an initial boiling point of about 450° F., removed through line 25. The heavy fraction is combined with hydrogen from line 26 and the combined stream is introduced into tubular reactor 27, wherein it is subjected to conditions of highly turbulent flow at a temperature between about 800 and 950° F. The effluent is then introduced into stripper 29 through line 28. In stripper 29 a separation is made between the gaseous and vaporous materials and the liquid materials of the hydrogenation product, the gaseous and vaporous materials leaving stripper 29 through line 30 and the liquid or non-volatilized materials descending through the stripper and being contacted counter-currently with a separately heated stream of hydrogen introduced through line 31. In the intermediate and lower sections of stripper 29 additional hydrogenation takes place with the conversion of a portion of the liquid hydrogenation product to hydrocarbon vapors. These vapors together with the additional hydrogen introduced through line 31 are also withdrawn from stripper 29 through line 30. From the bottom of the stripper, unvaporized hydrocarbons are removed through line 37. The hydrocarbons may be converted into lighter materials as by vis-breaking, thermal cracking or coking, and the products introduced into fractionator 22 or reactor 27 by means not shown or the products may be subjected to other refining treatment. Alternatively, these hydrcarbons may be subjected to partial combustion to produce a synthesis gas which is reacted with steam in a water gas shift reaction. The product gas is then scrubbed for $CO_2$ removal and the scrubbed product is advantageously introduced into the system, preferably through line 43, as make-up hydrogen.

The stream of hydrocarbon vapors and hydrogen withdrawn through line 30 then passes into tubular reactor 33 where it is subjected to conditions of highly turbulent flow at a temperature ranging from about 850 to 1100° F.

The hydroconversion product passes from reactor 33 through line 34 to cooler-separator 35 where a sufficient cooling is effected to reduce the temperature of the stream to below 800° F. The hydrocarbons condensed by the cooling pass through line 36 and advantageously are combined with the bottoms from stripper 29 in line 37. The resulting stream is withdrawn from the system through line 38 for use as a fuel or for additional treatment or for the production of hydrogen by partial combustion. The overhead from separator 35, composed of hydrogen and vaporous hydrocarbons, is introduced into catalyst unit 40 through line 41. Catalyst unit 40 contains a sulfur resistant hydrogenation catalyst such as nickel sulfide-tungsten sulfide, nickel sulfide-molybdenum sulfide, cobalt sulfide-molybdenum sulfide, cobalt oxide-molybdenum oxide, nickel oxide-molybdenum oxide or mixtures thereof. After being contacted with the catalyst at a temperature between about 800 and 900° F., the reactant stream passes through line 32 into high pressure separator 42 from which hydrogen is removed through line 43, a portion being recycled through lines 26 and 25 to reactor 27 and a separate portion through heater 45 and line 31 to stripping tower 29.

If hydrogen of high purity is desired, overhead from high pressure separator 42, which in addition to hydrogen, contains some methane may be subjected to partial combustion with oxygen or oxygen enriched air to produce a synthesis gas composed primarily of carbon monoxide and hydrogen. The synthesis gas is then contacted with steam in a water gas shift reaction to yield a gas made up, for the most part, of hydrogen and carbon dioxide. Removal of the carbon dioxide by scrubbing or partial condensation results in a gas of high hydrogen purity. Advantageously the above purification procedure is carried out at high pressures generally in excess of 500 p.s.i.g. When the above purification procedure is followed, it usually is not necessary to add make-up hydrogen to the stream as the methane present in the overhead from high pressure separator 42 is converted into hydrogen.

Bottoms from high pressure separator 42 are transferred through line 45 to low pressure separator 46 from which light hydrocarbon gases to be used as a fuel or for the production of hydrogen by partial combustion are removed through line 47. The low pressure separator bottoms pass through line 48 to prefractionator 49 for the removal of heavy hydrocarbons boiling above about 450° F. which may be recycled to reactor 27 through lines 50 and 25. Alternatively, bottoms from prefractionator 49 may be sent to fractionator 22 through lines 50, 29 and 21 or to reactor 33 through lines 50, 18 and 19.

Overhead from prefractionator 49 is sent through line 51 to fractionator 52 from which light normally liquid hydrocarbons boiling below about 160° F. are removed overhead through line 53 and combined with the light straight run fraction in line 23. Bottoms from fractionator 52 are withdrawn through line 54 and together with hydrogen from line 55 are passed into catalyst unit 56 where they are contacted with a hydrogenation catalyst. Effluent from catalyst unit 56 passes through line 57 to separator 58 where a separation is made between the hydrogen and the hydrocarbon. The hydrogen is recycled through lines 60 and 43. The hydrocarbons pass through line 61 to extraction unit 62 wherein a separation is made between the aromatic and the non-aromatic hydrocarbons. This may be done by contacting the hydrocarbon with a solid adsorbent such as silica gel or a molecular sieve or by treating the hydrocarbons with a selective solvent such as furfural, diethylene glycol, triethylene glycol or mixtures thereof. The non-aromatic hydrocarbons are withdrawn from extraction unit 62 through line 63 and combined with the intermediate straight run fraction in line 24. The aromatic concentrate is then sent through line 64 to fractionator 65 where it is separated into benzene withdrawn through line 66, toluene withdrawn through line 67, mixed xylenes withdrawn through line 68 and heavy aromatics withdrawn through line 69.

To the intermediate stream leaving fractionator 22 through line 24 is added $C_5$ and heavier material through line 71 and this stream plus non-aromatic hydrocarbons introduced through line 63 and steam introduced through line 74 is introduced into pyrolysis unit 75 which is maintained at a temperature between 1100 and 1900° F. and a pressure between about 0 and 75 p.s.i.g. Effluent from pyrolysis unit 75 passes through line 76 to separation zone 77 which may consist of a series of fractionators and which effects a separation between $C_3$ and lighter hydrocarbons which are withdrawn through line 78, $C_4$ and naphtha hydrocarbons withdrawn through line 79 and introduced as a quench into line 41 or recycled to pyrolysis unit 75 through lines 59 and 24 and heavier than naphtha materials withdrawn through line 38 for use as a fuel or for the production of hydrogen.

The light fraction from fractionator 22 is combined in line 23 with light hydrocarbons from line 53 and the combined stream introduced into debutanizer 80 from which $C_4$ and lighter materials are removed overhead through line 81 and $C_5$ and heavier materials removed through line 71. The $C_4$ and lighter materials are introduced into purification zone 82 for the removal of materials such as $H_2S$, $CO_2$ and water. This may be effected by subjecting the hydrocarbon stream to contact with an amine solution and a caustic solution followed by drying. The purified hydrocarbons pass through line 83 to deethanizer 84 from which $C_2$ and lighter materials are removed overhead through line 86. The bottoms from deethanizer 84 are combined in line 87 with ethane from line 88 and steam from line 89 and the combined stream introduced into pyrolysis unit 90 which is maintained at a temperature between 1100 and 1900° F. and a pressure between about 0 and 75 p.s.i.g. The pyrolysis product, if desired, may be re-subjected to a purification treatment similar to that described above for the $C_4$ and lighter hydrocarbons and may also advantageously be treated for the removal of acetylene. The pyrolysis product is then introduced together with light hydrocarbon gases from lines 86 and 78 through line 91 into fractionation zone 92 which may consist of a series of fractionating vessels. In fractionation zone 92 the pyrolysis product and the combined hydrocarbon streams are separated into a fuel gas composed principally of methane and hydrogen withdrawn through line 95, ethylene withdrawn through line 96, ethane withdrawn through line 88, propylene withdrawn through line 97 and propane and heavier hydrocarbons withdrawn through line 98. Advantageously, the propane cut is sent to separation zone 77 for the removal of higher boiling materials formed in pyrolysis unit 90 and the propane is returned to fractionator 92 through lines 78 and 91.

It is also possible to eliminate separator 35 and pass the entire effluent from hydroconversion zone 33 to catalyst unit 40. In this event the heavy aromatics withdrawn through line 69 are advantageously combined with the bottoms from stripper 29 to facilitate handling of the bottoms.

If desired, a separate side stream boiling within the range of about 450–700° F. may be taken from fractionator 22 and introduced into reactor 33 through lines 19 and 30. In fact, it is possible to eliminate pyrolysis unit 75 and to send all normally liquid material boiling below about 700° F. from fractionator 22 to reactor 33 through line 19. In this event, materials in lines 71 and 63 would be transferred by means of lines, not shown, to reactor 33.

In one example of the process of the present invention, an Arabian crude is fractionally distilled and material boiling above 450° F. amounting to 64.5% by volume of the crude is mixed with 5000 cu. ft./bbl. of a hydrogen-containing gas and passed through a first tubular reaction zone at a temperature of 875° F., a pressure of 1500 p.s.i.g. and a turbulence level of 190. The effluent from the first reaction zone is passed to a separating zone where vaporous materials comprising hydrogen and vaporous hydrocarbons are separated from the unvaporized materials which latter descend through a contacting zone countercurrently to an upwardly flowing stream of hydrogen heated to a temperature of 900° F., and introduced into the bottom of the contacting zone at a rate corresponding to 7000 cu. ft./bbl. of liquid feed to the first reaction zone. The upwardly-flowing hydrogen together with any vapors formed in the contacting zone is combined with the vaporous materials recovered from the separating zone and the combined stream is passed through a second tubular reaction zone at a temperature of 900° F., a pressure of about 1000 p.s.i.g. and a turbulence level of about 200. Effluent from the second reaction zone is cooled to a temperature of 780° F. and is passed through a catalytic zone containing a cobalt molybdate on alumina catalyst at a temperature of 750° F. and a pressure of 800 p.s.i.g. The normally liquid portion of the product boiling up to 350° F. contains 25% aromatic hydrocarbons, 28.15% naphthenes and 46.85% paraffins and is suitable for use as a high octane motor fuel.

However, if chemicals are the desired end product, the $C_5$—350° F. fraction of the product is contacted with a selective solvent comprising a mixture of diethylene glycol and triethylene glycol to remove the aromatics therefrom. Fractionation of the recovered aromatics gives a yield of 39% benzene, 48% toluene and 11% mixed xylenes. The nonparaffinic balance is combined with the normally liquid virgin naphtha boiling up to 450° F. and subjected to pyrolysis in the presence of steam at a temperature of 1500° F. The normally gaseous straight run material is also subjected to pyrolysis at a temperature of 1650° F. and the combined pyrolysis product is treated to recover the ethylene and propylene produced by the pyrolysis reaction. The ultimate yield from the Arabian crude, including a consumption of 6.6 pounds of hydrogen/bbl. of hydrocarbon feed, is tabulated as follows:

| | Wt. percent |
|---|---|
| $CH_4$ | 23.1 |
| $C_2$ | 25.2 |
| $C_3$ | 12.7 |
| Aromatics | 21.9 |
| Fuel oil | 17.7 |
| Loss | 1.6 |

Obviously, many modifications and variations of the invention as hereinbefore set forth may be made without departing from the spirit and scope thereof and therefore only such limitations should be imposed as are indicated in the appended claims.

The invention claimed is:

1. A process for the hydroconversion of a hydrocarbon liquid which comprises passing said hydrocarbon liquid and hydrogen through a first tubular reaction zone at a temperature between about 800 and 950° F., a pressure not less than about 500 p.s.i.g. under conditions of turbulent flow, separating the effluent comprising hydrogen, vaporous hydrocarbons and liquid hydrocarbons into a gasiform portion and a liquid portion, contacting said liquid portion wtih a hydrogen stream separately heated to a temperature between about 800 and 900° F. in a non-catalytic contacting zone to effect the hydroconversion of a portion of said liquid portion, withdrawing non-volatilized hydrocarbons from said contacting zone, separately withdrawing unreacted hydrogen and hydrocarbon vapors from the contacting zone and combining same with said gasiform portion, and passing the resulting combined stream through a second tubular reaction zone under conditions of turbulent flow at a temperature between about 850 and 1100° F. and a pressure not less than about 500 p.s.i.g.

2. The process of claim 1 in which the turbulence level in each reaction zone is at least 25.

3. The process of claim 1 in which the temperature in the second reaction zone is higher than the temperature in the first reaction zone.

4. The process of claim 1 in which the pressure in each reaction zone is between 1000 and 5000 p.s.i.g.

5. A process for the conversion of a hydrocarbon liquid into a lighter hydrocarbon liquid of reduced sulfur content which comprises passing a hydrocarbon liquid and hydrogen through a first elongated reaction zone under conditions of turbulent flow at a temperature between about 750 and 900° F. and a pressure not less than about 500 p.s.i.g., separating the reaction zone effluent comprising hydrogen, vaporous hydrocarbons and liquid hydrocarbons into a gasiform portion and a liquid portion, contacting said liquid portion with a hydrogen stream separately heated to a temperature between about 800 and 900° F. in a non-catalytic contacting zone to convert a portion of the liquid hydrocarbons to vapors, withdrawing non-volatilized hydrocarbons from said contacting zone, separately withdrawing unreacted hydrogen and hydrocarbon vapors formed in said contacting zone and combining same with said gasiform portion, passing the resultant combined stream through a second elongated reaction zone under conditions of turbulent flow at a temperature between about 900 and 1100° F. and a pressure not less than about 750 p.s.i.g. and contacting at least a portion of the hydrocarbon effluent from the second hydroconversion zone with a sulfur resistant hydrogenation catalyst at a temperature between about 700 and 800° F. and a pressure between about 200 and 1000 p.s.i.g.

6. The process of claim 5 in which the flow of liquid hydrocarbons and separately heated hydrogen in the non-catalytic contacting zone is countercurrent.

7. The process of claim 5 in which the effluent from the second hydroconversion zone is cooled to a temperature between about 700 and 800° F. and the condensate so formed is combined with the non-volatilized hydrocarbons withdrawn from the non-catalytic contacting zone.

8. The process of claim 5 in which desulfurized product boiling above about 450° F. is recycled to said first hydroconversion zone.

9. The process of claim 5 in which the desulfurized product is fractionated to produce a fraction having a boiling range of from about 160 to 450° F., said fraction is contacted with a selective agent to effect separation of aromatic hydrocarbons from non-aromatic hydrocarbons and the separated aromatic hydrocarbons are fractionated to yield benzene, toluene and xylenes.

10. A process for the conversion of a petroleum oil into valuable chemicals which comprises separating a petroleum oil into a light fraction containing $C_5$ hydrocarbons and a heavy fraction boiling above about 450° F., subjecting said light fraction to pyrolysis conditions including a temperature between about 1100 and 1900° F., recovering ethylene from the pyrolysis product, passing said heavy fraction and hydrogen through a first elongated reaction zone under conditions of turbulent flow at a temperature between about 800 and 1000° F. and a pressure not less than about 1000 p.s.i.g., separating the reaction zone effluent comprising hydrogen, vaporous hydrocarbons and liquid hydrocarbons into a gasiform portion and a liquid portion, contacting said liquid portion with a hydrogen stream separately heated to a temperature between about 800 and 900° F. in a non-catalytic contacting zone to convert a portion of the liquid hydrocarbons to vapors, withdrawing non-volatilized hydrocarbons from said contacting zone, separately withdrawing unreacted hydrogen and hydrocarbon vapors formed in the contacting zone and combining same with said gasiform portion, passing the resulting combined stream through a second elongated hydroconversion zone under conditions of turbulent flow at a temperature between about 900 and 1100° F. and a pressure not less than about 750 p.s.i.g. and separating the hydroconversion product into a non-aromatic portion and an aromatic portion.

11. The process of claim 10 in which the non-aromatic portion is combined with said light fraction and the combined stream subjected to pyrolysis.

12. A process for the conversion of a petroleum oil into valuable chemicals which comprises fractionating said petroleum oil into a light liquid fraction having an end boiling point of about 450° F. and a heavy fraction having an initial boiling point not less than about 450° F., passing said heavy fraction and hydrogen through a first elongated reaction zone under conditions of turbulent flow at a temperature between about 800 and 1000° F. and a pressure not less than about 1000 p.s.i.g., separating the reaction zone effluent comprising hydrogen, vaporous hydrocarbons and liquid hydrocarbons into a gasiform portion and a liquid portion, contacting said liquid portion in a non-catalytic contacting zone with a hydrogen stream separately heated to a temperature between about 800 and 900° F. to convert a portion of the liquid hydrocarbons to vapors, withdrawing unreacted hydrogen and hydrocarbon vapors formed in the contacting zone and combining same with said gasiform portion, passing the resulting combined stream through a second elongated reaction zone under conditions of turbulent flow at a temperature between about 900 and 1100° F. and a pressure not less than about 750 p.s.i.g., recovering from the effluent from said second reaction zone a hydrocarbon liquid having an end boiling point not greater than about 450° F., separating said last mentioned liquid into an aromatic portion and a non-aromatic portion, combining said non-aromatic portion with said light fraction, subjecting the resulting mixture to pyrolysis at a temperature between about 1100 and 1700° F., recovering unsaturated gaseous hydrocarbons from the pyrolysis product and combining normally liquid pyrolysis product with the effluent from said second reaction zone.

13. The process of claim 12 in which the turbulence level in said first and second reaction zones is at least 25.

14. The process of claim 12 in which the turbulence levels in said first and second reaction zones are between 50 and 1000.

15. The process of claim 12 in which the effluent from the second reaction zone is subjected to a catalytic hydrogenation prior to being separated into an aromatic and a non-aromatic fraction.

16. The process of claim 12 in which the material boiling above 450° F. separated from the second reaction zone effluent is recycled to said second reaction zone.

17. The process of claim 12 in which the material boiling above 450° F. separated from the second reaction zone effluent is recycled to said first reaction zone.

18. A process for the hydroconversion of a hydrocarbon liquid which comprises passing said hydrocarbon liquid and hydrogen through a first tubular reaction zone at a temperature between about 800 and 950° F., a pressure not less than about 500 p.s.i.g. under conditions of turbulent flow, separating the effluent comprising hydrogen, vaporous hydrocarbons and liquid hydrocarbons into a gasiform portion containing substantially all of the gaseous materials present in said effluent and a liquid portion containing substantially all of the liquid material present in said effluent, contacting said liquid portion with a hydrogen stream separately heated to a temperature between about 800 and 900° F. in a non-catalytic contacting zone to effect the hydroconversion of a portion of said liquid portion, withdrawing non-volatilized hydrocarbons from said contacting zone, separately withdrawing unreacted hydrogen and hydrocarbon vapors from the contacting zone and combining same with said gasiform portion, passing the resulting combined stream through a second tubular reaction zone under conditions of turbulent flow at a temperature between about 850 and 1100° F. and a pressure not less than about 500 p.s.i.g., separating a hydrogen containing gas containing also a minor amount of light hydrocarbons from the hydroconversion product, subjecting said hydrogen containing gas to partial combustion with free oxygen to produce a gas containing hydrogen and carbon monoxide, subjecting said gas containing hydrogen and carbon monoxide to a water gas shift reaction to produce a gas containing hydrogen and carbon dioxide, removing substantially all of said carbon dioxide from said gas containing same to produce a gas stream of high hydrogen purity and returning a portion of said gas stream to said first tubular reaction zone.

19. A process for the hydroconversion of a petroleum oil which comprises separating said oil into a light fraction boiling below about 700° F. and a heavy fraction boiling above about 700° F., passing said heavy fraction and hydrogen through a first tubular reaction zone under conditions of turbulent flow at a temperature between about 800 and 1000° F. and a pressure not less than about 500 p.s.i.g., separating the reaction zone effluent comprising hydrogen, vaporous hydrocarbons and liquid hydrocarbons into a gasiform portion containing substantially all of the gaseous material in said effluent and a liquid portion containing substantially all of the liquid in said effluent, contacting said liquid portion with a hydrogen stream separately heated to a temperature between about 800 and 900° F., in a non-catalytic contacting zone to convert a portion of the liquid hydrocarbons to vapors, withdrawing non-volatilized hydrocarbons from said contacting zone, separately withdrawing unreacted hydrogen and hydrocarbon vapors formed in the contacting zone and combining same with said gasiform portion and said light fraction and passing the resulting combined stream through a second tubular reaction zone under conditions of turbulent flow at a temperature between about 900 and 1100° F. and a pressure not less than about 750 p.s.i.g.

References Cited in the file of this patent

UNITED STATES PATENTS

| | | |
|---|---|---|
| 2,706,705 | Oettinger et al. | Apr. 19, 1955 |
| 2,754,342 | Shelton | July 10, 1956 |
| 2,859,169 | Herman | Nov. 4, 1958 |
| 2,884,368 | Sweeney | Apr. 28, 1959 |
| 2,945,800 | Ciapetta et al. | July 19, 1960 |
| 2,949,420 | Eastman et al. | Aug. 16, 1960 |
| 2,989,461 | Eastman et al. | July 20, 1961 |